United States Patent
Hong et al.

(10) Patent No.: US 10,689,801 B2
(45) Date of Patent: Jun. 23, 2020

(54) COLORED COATINGS AND ARTIFICIAL LEATHERS CONTAINING COLORANT COMPLEXES

(71) Applicant: Milliken & Company, Spartanburg, SC (US)

(72) Inventors: Xiaoyong Michael Hong, Greer, SC (US); Chunping Xie, Shanghai (CN); Brian Sun, Shanghai (CN); Mary E. Mason, Moore, SC (US); Sanjeev K. Dey, Spartanburg, SC (US)

(73) Assignee: Millikan & Company, Spartanburg, SC (US)

( * ) Notice: Subject to any disclaimer, the term of this patent is extended or adjusted under 35 U.S.C. 154(b) by 606 days.

(21) Appl. No.: 14/683,161

(22) Filed: Apr. 10, 2015

(65) Prior Publication Data

US 2015/0299942 A1 Oct. 22, 2015

Related U.S. Application Data

(60) Provisional application No. 61/982,367, filed on Apr. 22, 2014.

(51) Int. Cl.
| | |
|---|---|
| *D06N 3/00* | (2006.01) |
| *C09D 175/04* | (2006.01) |
| *C08L 75/04* | (2006.01) |
| *D06N 3/14* | (2006.01) |
| *C08K 5/42* | (2006.01) |
| *C08K 5/19* | (2006.01) |

(52) U.S. Cl.
CPC ............ *D06N 3/0065* (2013.01); *C08L 75/04* (2013.01); *C09D 175/04* (2013.01); *C08K 5/19* (2013.01); *C08K 5/42* (2013.01); *D06N 3/14* (2013.01); *D06N 2209/0861* (2013.01)

(58) Field of Classification Search
CPC ...... D06N 3/0065; D06N 3/14; C09D 175/04; C08L 75/04; C08K 5/42; C08K 5/19
See application file for complete search history.

(56) References Cited

U.S. PATENT DOCUMENTS

| | | | |
|---|---|---|---|
| 3,607,358 A | 9/1971 | Mechenhard et al. | 117/63 |
| 3,879,336 A | 4/1975 | Maeda et al. | 260/37 |
| 3,880,797 A | 4/1975 | Maeda et al. | 260/37 |
| 3,901,648 A | 8/1975 | Arbaud | 8/4 |
| 4,284,729 A | 8/1981 | Cross et al. | 521/158 |
| 4,367,307 A | 1/1983 | Hirai et al. | 524/590 |
| 4,756,947 A | 7/1988 | Nishikawa et al. | 428/151 |
| 5,053,464 A | 10/1991 | Shirai et al. | 525/454 |
| 5,766,268 A | 6/1998 | Bruknke | 8/647 |
| 5,785,745 A | 7/1998 | Lauw et al. | 106/31.27 |
| 5,876,466 A | 3/1999 | Nakashima et al. | 8/442 |
| 5,938,828 A | 8/1999 | Zhao et al. | 106/31.43 |
| 5,948,152 A | 9/1999 | Zhao et al. | 106/31.43 |
| 5,948,153 A | 9/1999 | Ann et al. | 106/31.43 |
| 6,046,330 A | 4/2000 | Qinghong et al. | 544/327 |
| 6,248,161 B1 | 6/2001 | Nguyen et al. | 106/31.27 |
| 6,287,348 B1 | 9/2001 | Bruhnke | 8/543 |
| 6,306,459 B1 | 10/2001 | Fleming | 427/163.4 |
| 6,361,850 B1 | 3/2002 | Billingsley et al. | 428/143 |
| 6,451,071 B1 | 9/2002 | Bruhnke | 8/543 |
| 6,479,561 B1 | 11/2002 | Zhou et al. | 521/155 |
| 6,497,732 B1 | 12/2002 | Soane et al. | 8/543 |
| 6,586,051 B2 | 7/2003 | Zhou et al. | 427/372.2 |
| 7,662,461 B2 | 2/2010 | Xia et al. | 428/160 |
| 7,824,737 B2 | 11/2010 | Xia et al. | 427/372.2 |
| 7,872,069 B2 | 1/2011 | Xia et al. | 524/591 |
| 8,148,318 B2 | 4/2012 | Song et al. | 510/504 |
| 8,273,166 B2 | 9/2012 | Birau et al. | 106/31.29 |
| 2005/0124727 A1 | 6/2005 | Huber et al. | 523/160 |
| 2008/0169058 A1 | 7/2008 | Feng et al. | 156/246 |
| 2014/0256468 A1* | 9/2014 | Tutmark | A63B 37/0022 473/371 |
| 2015/0299511 A1 | 10/2015 | Hong et al. | |

FOREIGN PATENT DOCUMENTS

| | | |
|---|---|---|
| CN | 101748622 | 6/2010 |
| CN | 102746714 | 10/2012 |
| WO | WO 2012/119810 | 9/2012 |
| WO | WO 2012/119821 | 9/2012 |
| WO | WO 2012/126665 | 9/2012 |
| WO | WO 2012/126987 | 9/2012 |
| WO | WO 2012/119811 | 9/2013 |

* cited by examiner

*Primary Examiner* — Cephia D Toomer
(74) *Attorney, Agent, or Firm* — Brenda D. Wentz

(57) ABSTRACT

The present invention relates to substrates comprising a coating on the surface thereof containing colorant complexes made from specific anionic dyes complexed with cationic compounds, such as substrates having a coating thereon intended to mimic the look and feel of leather. The inventive colored coatings have superior compatibility, transparency, solvent fastness, non-migration and water fastness properties.

12 Claims, No Drawings

COLORED COATINGS AND ARTIFICIAL LEATHERS CONTAINING COLORANT COMPLEXES

CROSS REFERENCE TO RELATED APPLICATIONS

This application claims priority to U.S. Patent Application Ser. No. 61/982,367, entitled "Colored Coatings and Artificial Leathers Containing Colorant Complexes," which was filed on Apr. 22, 2014, and which is entirely incorporated by reference herein.

FIELD OF THE INVENTION

The present invention relates to substrates comprising a coating on the surface thereof containing colorant complexes made from specific anionic dyes complexed with cationic compounds, such as substrates having a coating thereon intended to mimic the look and feel of leather. The inventive colored coatings have superior compatibility, transparency, solvent fastness, non-migration and water fastness properties.

BACKGROUND OF THE INVENTION

Synthetic leather typically is produced by coating or laminating an elastic polymer resin, such as a polyurethane resin, a polyvinyl chloride resin, or a blend of such resins, onto the surface of a fibrous base material. In order to produce a synthetic leather in a variety of colors and/or shades, various pigments or dyes have been used to color the resin applied to the surface of the base material. However, the use of such pigments and dyes has not been without its disadvantages and drawbacks.

For example, pigments usually have low tinting strength and a dull shade, which can limit the aesthetic qualities of synthetic leather produced using them. Pigments typically lack solubilizing groups, which frequently allows the pigment particles to aggregate and form larger secondary and tertiary aggregate particles during production processes. Owing to these difficulties, synthetic leathers colored with conventional pigments often exhibit poor color retention, have a dark or dull shade, or contain unsuitable variations in color depth. While these problems can be partially addressed through the addition of dispersing agents or by utilizing pigment dispersions, these measures often result in increased production costs and still require great care to minimize color variations produced by settling of the pigment(s) and/or incompatibility of these components with the resin.

Dyes, on the other hand, typically contain solubilizing groups that can facilitate dispersion of the dye in a suitable medium. Dyes also typically exhibit relatively high tinting strength, good transparency, good thermal stability, and acceptable resin compatibility. Nevertheless, dyes typically exhibit poor weather durability, poor water resistance, poor oil resistance, and often migrate or bleed through to the transfer substrates, such as a release paper, used to produce the synthetic leather. In order to address the migration of dyes to the transfer substrate, attempts have been made to utilize nylon or polyurethane overcoats applied to the transfer substrate. However, satisfactory topcoats have not been developed without incurring significantly higher cost.

U.S. Pat. Nos. 7,662,461, 7,824,737 and CN 102,746,714 disclosed a synthetic leather articles comprising a polyurethane coating made from polymeric colorants and/or polyurethane colorants made from polymeric colorants with reactive functional groups. Such polyurethane polymeric colorants give great transparency, compatibility and vivid colors. But these polyurethane colorants do not have good migration properties as pigments or as good as desired.

A need therefore remains for novel colored synthetic leather articles that address the deficiencies of articles produced with conventional pigments, dyes and/or polymeric colorants, while still exhibiting the desired aesthetic qualities.

U.S. Pat. No. 5,948,152 discloses liquid complexes of anionic organic dyes with quaternary ammonium compounds which are homogeneous and thus substantially free of unwanted inorganic salts. U.S. Pat. No. 5,938,828 discloses solid complexes of anionic organic dyes with quaternary ammonium compounds which have average molecular weights of below about 900 which are substantially free from unwanted salts. U.S. Pat. No. 5,948,153 discloses water-soluble complexes of optical brighteners with quaternary ammonium compounds which are substantially free from unwanted salts. U.S. Pat. No. 6,046,330 discloses complexes of ultraviolet absorbers with quaternary ammonium compounds which are substantially free from unwanted salts. U.S. Pat. No. 8,273,166 discloses a phase change ink composition containing colorants made from anionic dyes and N-alkyl or N-aryl quaternary ammonium cations. U.S. Pat. No. 6,248,161 discloses a water-fast, dye-based, aqueous ink-jet ink formulation which contains anionic dye and at least one water-fast phosphonium salt.

There are some examples of such colorant complexes reported, while there is no prior art to use such colored complexes in coating formulation, especially synthetic leather coating layers, preferably polyurethane artificial leathers. The present invention provides such articles and methods for producing the same. This invention intends to provide colored polyurethane synthetic leathers which are transparent, compatible with the polyurethane resins, resistant to water and organic solvents, and do not have migration issues to the transfer substrates.

BRIEF SUMMARY OF THE INVENTION

This invention relates to a coating comprising at least one anionic dye, at least one quaternary cationic compound, and at least one resin, wherein the at least one anionic dye and quaternary cationic compound form a colored complex represented by

$AB_nQ_m$ wherein A is organic chromophore with or without organic substitution; B is an anionic group; Q is an organic cationic counterion; n and m are integers from 1 to 20.

DETAILED DESCRIPTION OF THE INVENTION

The term "colorant complex" as used herein refers to an ionic complex compound from charged colorants or dyes with organic counter ions.

The term "cationic compound" refers to any organic compound with at least one positive charge on the molecule.

A synthetic leather article comprises a substrate and a coating on at least one surface of the substrate. The coating comprises at least a resin and a colorant. The substrate can be any suitable substrate, such as a fibrous substrate. In certain possibly preferred embodiments, the substrate is a textile material. Suitable textiles include, but are not limited to, woven textiles, knit textiles, and non-wovens. The textiles can be made from any suitable natural fibers, synthetic fibers, or combinations thereof.

In order to promote adhesion between the substrate and the coating, the substrate can comprise a precoat layer on the surface to which the coating is applied. The precoat layer can comprise any suitable material, such as a material that promotes adhesion between the substrate and the coating. For example, the precoat layer can comprise elastomeric polymers.

Resins/Prepolymers

The resin in the coating can be any suitable resin. The resin typically will be selected to provide an article that is flexible and durable, while providing the properties necessary or desirable for mimicking real leather. In certain possibly preferred embodiments, the resin is selected from the group consisting of polyurethane resins, polyurea resins, and combinations thereof. Suitable polyurethanes include linear polyurethanes as well as cross-linked polyurethanes, such as a polyurethane cross-linked with hexamethylene diisocyanate trimer.

The resins suitable for use in the coating can be produced using any suitable polyol. Suitable polyols include, but are not limited to, glycols of low molecular weight, such as ethylene glycol, 1,2-propylene glycol, 1,3-propylene glycol, 1,4-butylene glycol, and 1,6-hexamethylene glycol; polyester diols obtained from dibasic acids, such as adipic acid, maleic acid, and terephthalic acid; polyester diols, such as polylactones obtained by subjecting lactones to ring-opening polymerization with glycols; polycarbonate diols; and polyether diols, such as polytetramethylene glycol, polyethylene glycol, and polypropylene glycol.

The resins suitable for use in the coating can be produced using any suitable isocyanate. Suitable isocyanates include, but are not limited to, aromatic diisocyanates, such as toluene-2,4-diisocyanate (TDI), 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenyl-isocyanate) (MDI), polymeric MDI, durylene diisocyanate, tolidine diisocyanate, xylylene diisocyanate (XDI), 1,5-naphthalene diisocyanate, benzidine diisocyanate, o-nitrobenzidine diisocyanate, and 4,4-diisocyanatodibenzyl; aliphatic diisocyanates, such as methylene diisocyanate, 1,4-tetramethylene diisocyanate, 1,6-hexamethylene diisocyanate, and 1,10-decamethylene diisocyanate; alicyclic diisocyanates, such as 1,4-cyclohexylene diisocyanate, 4,4-methylene-bis(cyclohexylisocyanate), 1,5-tetrahydronaphthalene diisocyanate, isophorone diisocyanate, hydrogenated MDI, and hydrogenated XDI; and polyurethane prepolymers obtained by reacting any of the aforementioned diisocyanates with polyols or polyamines of low molecular weights such that the resulting prepolymers have isocyanate groups at ends thereof. Among the aforementioned, aromatic diisocyanates, particularly diphenylmethane-4,4'-diisocyante (4,4'-MDI) or polymeric MDI, are preferred for obtaining articles exhibiting good physical characteristics such as thermal stability, solution stability, and fracture strength. Alicyclic diisocyanates, such as isophorones, are preferred for obtaining polyurethanes that exhibit anti-yellowing properties and are not easily discolored upon exposure to sunlight.

The resins or prepolymers suitable for use in the coating can be produced using suitable chain extenders. These include, but are not limited to, water; low-molecular diols, such as ethylene glycol, 1,4-butanediol, and propylene glycol; aliphatic diamines, such as ethylenediamine; aromatic diamines, such as 4,4'-diaminodiphenylmethane; alicyclic diamines, such as 4,4'-diaminodicyclohexylmethane and isophoronediamine; alkanolamines, such as ethanolamine; hydrazines; and dihydrazides, such as succinic dihydrazide. Among the aforementioned chain extenders, the diamine compounds are preferable, with 4,4'-diaminodiphenylmethane being particularly preferred due to its heat resistance and 4,4'-diaminodicyclohexylmethane being preferred for light resistance. The aforementioned chain extenders can, of course, be used alone or in any suitable combination.

Other resins or polymers can be used in combinations with the aforementioned resins. Thus, in certain embodiments, the coating can comprise one or more polymers or resins selected from the group consisting of polyvinyl chloride (PVC), polyvinylidene chloride, polyvinyl acetate, polyacrylic acid, alkylpolyacrylate, polymethacrylic acid, alkylpolymethacrylate, and copolymers thereof.

The resins can be either organic solvent based or water based systems. They can be a solution, dispersion, or neat molten liquid.

Colorants

The colorant in the coating can be any suitable colorant complex as defined below with a formula of $AB_nQ_m$ wherein A is organic chromophore with or without organic substitution; B is an anionic group; Q is an organic cationic counterion; n and m are integers from 1 to 20; and m is preferably less than or equal to n.

There are a broad range of anionic dyes with different chromophore moiety, A: azo groups such as monoazo, bisazo, and polyazo including their complexes with Cr, Fe, Co, and Cu; phthalocyanine; anthraquinone; aza(18)annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. The chromophore A can have one or more aliphatic or aromatic substitutions, which can be polymeric.

The anionic group, B, can be any organic functional group with negative charge, which can be complexed with a cationic compound. Preferred anionic dyes are those that contain one or more sulfonate groups, carboxyl groups and/or hydroxyl salt groups. The most preferred anionic group is sulfonate group.

The organic cationic counterion, Q, can be any organic functional group with a positive charge capable of complexing with an anionic dye. Preferred cationic compounds are selected from quaternary ammonium salts and any nitrogen-based cationic compound, sulfonium salts, phosphonium salts, oxonium salts, and any combination thereof of alkyl, aryl and alkyl/aryl compounds. The most preferred cationic groups are nitrogen-based and phosphonium cationic groups.

The technique of forming complexes between anionic dyes and quaternary ammonium or phosphonium compounds ("quat") is known. It has been found that the complexation of an anionic dye with a cationic compound (quaternary ammonium or a phosphonium) and the subsequent removal of substantially all the excess unwanted salts formed during such a reaction produce a colorant complex which possesses the highly desired properties. It has been found that substantially salt-free anionic dye/cationic compound colorant complexes have high coloring capacity within many different media with a very low potential for extraction. When placed in a complexing solution, the anionic dye and the quaternary ammonium or a phosphonium show a great affinity for one another such that upon disassociation with their respective cations and/or counter ions, the complexation of the dye and quat drives the formation of the unwanted salts comprised of the free cations and counter ions. Once these unwanted salts are formed, they are easy to remove through filtration or extraction techniques. Such a salt removal ensures the dye and quat will remain in a complex together rather than potentially reacting with unwanted free cations and/or counter ions upon disassociation within the dye solution. Thus, the desired properties are obtained with a greater amount of the dye/quat complex and a much lower amount of unwanted residual salt.

The anionic dyestuffs, as referred to herein, denote all of those dyes having an anionic group, i.e., the acid dyes, direct dyes, metal complex dyes, reactive dyes and acid mordant dyes. A wide range of anionic dyes, such as acid dyes, direct dyes, metal complex dyes, reactive dyes and certain food dyes, from yellow to cyan, are useful as the colorant complexes. Such chromophore molecules, however, should have at least one sulfonic or carboxylic acid functionality in order to form the necessary complex with the quaternary ammonium and/or phosphonium compound. The cationic group bonds with such acid (i.e., sulfonic and/or carboxylic) groups so as to form ionic bonds. Upon complexation, then, the free counter ions of both components react together to form the aforementioned unwanted salts which require removal (at least to a substantial extent) from the resultant complex in order to provide the desired homogeneous colorant having the aforementioned beneficial properties.

Chromophores containing at least one sulfonic acid or carboxylicacid functionality are preferred. Examples of suitable anionic dyes are Acid Yellow 11, 17, 23, 25, 40, 3; Direct Yellow 4, 11, 44; Acid Orange 7, 24; Direct Orange 15, 39; Acid Violet 7, 19, 47; Direct Violet 9; Acid Red 1, 4, 52, 87; Direct Red 80, 81, 82; Acid Blue 127, 9; Acid Black 1, 2; Direct Blue 86, 80, 199; Direct Black 22, 80.

Suitable anionic dyes can be reactive dyes and their reaction derivatives. The examples of the reactive dyes can be C.I. Reactive Black 5, C.I. Reactive Blue 2, C.I. Reactive Blue 4, C.I. Reactive Blue 7, C.I. Reactive Blue 9, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, or C.I. Reactive Yellow 95. These reactive dyes can react with organic compounds with a nucleophilic group, such as amine or hydroxy, to form anionic dyes where the reactive groups are capped with a nucleophilic group.

A wide range of quaternary ammonium compounds have been shown to be useful for practicing the invention. A broad list of potentially useful quaternary ammonium compounds within this invention includes trialkyl, dialkyl, dialkoxy alkyl, monoalkoxy, benzyl, and imidazolinium quaternary ammonium compounds. The particularly preferred quaternary ammonium compounds are noted in TABLE 1 below as this is merely a broad list of different classes of quaternary ammonium compounds which may be useful.

TABLE 1

| Class | Example |
|---|---|
| Trialkyl quats | Methyl tri(hydrogenated tallow) ammonium chloride |
| Dialkyl quats | Dicoco dimethyl ammonium chloride |
| Dialkoxy alkyl quats | Methyl bis(polyethoxyethanol) coco ammonium chloride |
| Monoalkoxy quats | Methyl (polypropylene glycol) diethyl ammonium chloride |
| Benzyl quats | Dimethyl tallow benzyl ammonium chloride |
| imidazolinium quats | Methyl tallow amido-2-tallow imidazolinium methylsulfate |

Other nitrogen based cationic compounds include 4-(dimethylamino)pyridinium tribromide, dodecylethyldimethylammonium bromide, 1-dodecylpyridinium chloride hydrate, dodecyltrimethylammonium bromide, 1-ethyl-3-methyl-1H-imidazolium chloride, 1-ethyl-4-(methoxycarbonyl)pyridinium iodide, 6-hydroxy-2,4,5-triaminopyrimidine sulfate, 2-hydroxy-4-methylpyrimidine hydrochloride, stearyl trimethylammonium chloride, p-xylylene-bis(tetrahydrothiophenium chloride), trimethyl sulfonium iodide, diphenyl iodonium chloride, ferrocenium hexafluorophosphate, dodecyldimethyl(3-sulfopropyl)ammonium hydroxide, 1-(N,N-dimethylcarbamoyl)-4(2-sulfo-ethyl)pyridinium hydroxide, and 2-ethyl-5-phenylisoxazolium-3'-sulfonate, cationic quaternary ammonium fluoroalkyl surfactant, such as FLUORAD FC-135 surfactant (manufactured by 3M Co. of St. Paul, Minn.), SURFLON S-121 surfactant (manufactured by Seimi Chemical Co., Japan), or Neos FTERGENT 300 surfactant (manufactured by Neos, Japan).

Other conventional cationic species including carbonium salts, iodonium salts, sulfonium salts, pyrrilium salts, phosphonium salts, etc. can also be used for this invention. Some of these cationic compounds can increase the water resistance of the colorant complexes. Phosphonium salts are selected from the group consisting of allyl triphenyl phosphonium bromide, allyl triphenyl phosphonium chloride, vinyl triphenyl phosphonium bromide, (3-bromobutyl)triphenyl phosphonium bromide, (4-bromobutyl)triphenyl phosphonium bromide, (bromodifluoromethyl)triphenylphosphonium bromide, chloroethylene triphenyl phosphonium bromide, 1,1,1-trifluoroacetonyl triphenyl phosphonium bromide, methyl triphenyl phosphonium bromide, ethyl triphenyl phosphonium bromide, propyl triphenyl phosphonium bromide, n-butyl triphenyl phosphonium bromide, isopropyl triphenyl phosphonium bromide, n-pentyl triphenyl phosphonium bromide, acetonyl triphenyl phosphonium bromide, 4-carboxybutyl triphenyl phosphonium bromide, (ethoxycarbonylmethyl)triphenyl phosphonium bromide, (methoxymethyl)triphenyl phosphonium bromide, triphenyl phosphonium hydrobromide, (2-hydroxyethyl)triphenyl phosphonium chloride, (2-hydroxyethyl)triphenyl phosphonium bromide, [3-hydroxy-2-methylpropyl]triphenyl phosphonium bromide, [2-(trimethylsilyl)ethoxymethyl]triphenyl phosphonium chloride, methyltriphenoxy phosphonium iodide, [3-(dimethylamino)propyl]triphenyl phosphonium bromide, and dim ethylaminoethyl triphenyl phosphonium bromide. Other phosphonium: a phosphonium salt selected from the group consisting of (ethoxycarbonylmethyl)triphenyl phosphonium bromide, (ethoxycarbonylmethyl)triphenyl phosphonium chloride, (methoxymethyl) triphenyl phosphonium bromide, triphenyl phosphonium hydrobromide, (2-hydroxyethyl)triphenyl phosphonium chloride, (2-hydroxyethyl)triphenyl phosphonium bromide, [3-hydroxy-2-methylpropyl]triphenyl phosphonium bromide, [2-(trimethylsilyl)ethoxymethyl]triphenyl phosphonium chloride, methyltriphenoxy phosphonium iodide, [3-

(dimethylamino)propyl]triphenyl phosphonium bromide, acetonyl triphenyl phosphonium bromide, tetrakis(hydroxymethyl)phosphonium chloride, 2-acetonapthonyl triphenyl phosphonium bromide, 2',5'-dimethoxyphenacyltriphenyl phosphonium bromide, 1-hydroxydodecyl triphenyl phosphonium bromide, 2-ethylindolinyl triphenyl phosphonium bromide, 3'-methoxyphenacyl triphenyl phosphonium bromide, 3-methylpyrridinyl triphenyl phosphonium bromide, phenacyl dimethylaminophenyl diphenyl phosphonium chloride, methyl(dimethylaminophenyl diphenyl) phosphonium bromide, [3-(ethoxycarbonyl)-2-oxypropyl] triphenyl phosphonium chloride, (2-hydroxybenzyl) triphenyl phosphonium bromide, benzotriazol-1-yloxytripyrrolidino-phosphonium hexafluorophosphate, triphenyl(2-pyridylmethyl)phosphonium chloride hydrochloride, (4-ethoxybenzyl)triphenyl phosphonium bromide, (3-benzyloxypropyl)triphenyl phosphonium bromide, phenacyl triphenyl phosphonium chloride, benzotriazol-1-yloxytris(dimethylamino)phosphonium hexafluorophosphate, and 2-acetonapthonyl triphenyl phosphonium bromide.

A cationic compound can be selected from suitable ionic liquid, comprising an organic cation and an inorganic or organic anion. Examples are N-ethyl-N'-methylimidazolium (EMIM), N-methylimidazolium (MEHIM), N-butyl-N'-methylimidazolium (BMIM), N-ethyl-N'-ethylimidazolium (EEIM), N-n-propyl-N'—N-propylimidazolium (PPIM), and other Basionics™ ionic liquid products from BASF.

The cationic compound can be a cationic polymer. The cationic polymers will have cationic nitrogen-containing moieties such as quaternary ammonium or cationic amino moieties, or a mixture thereof. Any anionic counter-ions can be utilized for the cationic polymers so long as the water solubility criteria are met. Suitable counterions include halides (e.g., Cl, Br, I, or F, preferably Cl, Br, or I), sulfate, and methylsulfate. Others can also be used, as this list is not exclusive. Cationic polymers are suitable for the purposes of the present invention regardless of the number, type or concentration of the monomers used to make them and they can be in the form of a liquid or dried to a powder. Examples of such polymers are those marketed by Degussa under trade names Praestaret K-325 and Praestaret K-350 as well as Praestol E-125 and Praestor E-150.

The cationic nitrogen-containing moiety will be present generally as a substituent, on a fraction of the total monomer units of the cationic polymers. Thus, the cationic polymer can comprise copolymers, terpolymers, etc. of quaternary ammonium or cationic amine-substituted monomer units and other non-cationic units referred to herein as spacer monomer units. Such polymers are known in the art, and a variety can be found in the *CTFA Cosmetic Ingredient Dictionary*, 3rd edition, edited by Estrin, Crosley, and Haynes, (The Cosmetic, Toiletry, and Fragrance Association, Inc., Washington, D.C., 1982). Suitable cationic polymers include, for example, copolymers of vinyl monomers having cationic amine or quaternary ammonium functionalities with spacer monomers such as acrylamide, methacrylamide, alkyl and dialkyl acrylamides, alkyl and dialkyl methacrylamides, alkyl acrylate, alkyl methacrylate, vinyl caprolactone, and vinyl pyrrolidone. The alkyl and dialkyl substituted monomers preferably have $C_1$-$C_{20}$ alkyl groups. Other suitable spacer monomers include vinyl esters, vinyl alcohol (made by hydrolysis of polyvinyl acetate), maleic anhydride, propylene glycol, and ethylene glycol.

The cationic amines can be primary, secondary, or tertiary amines, depending upon the particular species and the pH of the mixture. In general, secondary and tertiary amines, especially tertiary amines, are preferred. Amine-substituted vinyl monomers can be polymerized in the amine form, and then optionally can be converted to ammonium by a quaternization reaction. Amines can also be similarly quaternized subsequent to formation of the polymer. For example, tertiary amine functionalities can be quaternized by reaction with a salt of the formula R'X wherein R' is a short chain alkyl, preferably a $C_1$-$C_{20}$ alkyl, and X is an anion which forms a water soluble salt with the quaternized ammonium.

The colorant complexes can be readily prepared by mixing the anionic dyes and cationic compounds in water at specific temperature. The colorant complexes can be further purified to remove the undesired salts.

Other Colorants

In addition to the above-described organic complex colorants, other coloring agents can be incorporated into the synthetic leather article in order to control the color hue. These coloring agents include conventionally known pigments and dyes. Examples of blue pigments include, but are not limited to, phthalocyanine C.I. Pigment Blue 15:3 and indanthrone C.I. Pigment Blue 60; examples of red pigments include, but are not limited to, quinacridone C.I. Pigment Red 122, azo C.I. Pigment Red 22, C.I. Pigment Red 48:1, C.I. Pigment Red 48:3 and C.I. Pigment Red 57:1; examples of yellow pigments include, but are not limited to, azo C.I. Pigment Yellow 12, C.I. Pigment Yellow 13, C.I. Pigment Yellow 14, C.I. Pigment Yellow 17, C.I. Pigment Yellow 97, C.I. Pigment Yellow 155, benzimidazolone C.I. Pigment Yellow 151, C.I. Pigment Yellow 154 and C.I. Pigment Yellow 180; examples of black pigments include, but are not limited to, carbon black. Examples of suitable dyes include, but are not limited to, solvent dyes, such as Yellow 82, Orange 5, Orange 62, Red 8, Red 62, Red 122, Blue 70, Black 27, and Black 34. For ease of handling and mixing in the production of the synthetic leather articles, any pigments used preferably are added in the form of a dispersion or in resin pallet/flake forms, and any dyes used preferably are added in the form of a solution or in resin pallet/flake forms.

Additives

In some instances, it may be desirable to include additives in the resin mixture, in addition to the resin and colorants. These additives include dispersing agents, plasticizers, special pigments, compatibilizers, matting agents, leveling agents, dye fixing agents, rheological controlling agents, and the like.

Making Synthetic Leathers

The synthetic leather articles of the invention can be produced using any suitable method. For example, the synthetic leather articles can be produced using both "a direct coating process" and "a transfer coating process", or "dry" and "wet" methods. In two-component technologies, organic colorant complexes preferably are mixed with polyols to react with isocyanates to form a high viscosity isocyanate- or hydroxyl-terminated prepolymer. This prepolymer can then be directly coated onto a substrate or onto transfer substrate (e.g., release paper) using a doctor blade and cured by respective curing methods. If a free resin film is produced, the film then needs to be laminated to a textile substrate in a subsequent step. In one-component technologies using commercially available polyurethane or polyurea resins, the resin can be used in the form of a solvent solution ("solvent method"), or the resin can be in the form of an aqueous dispersion ("aqueous method"). In the solvent method, the organic colorant complexes preferably are thoroughly mixed with a polyurethane solution in polar solvents, such as dimethylformamide (DMF) and/or methyl ethyl ketone (MEK). The high viscosity solution is then spread onto a carrier or release paper, and the material is oven dried and laminated onto a substrate to form a synthetic leather article. In the aqueous method, the organic colorant complexes preferably are thoroughly mixed with an aqueous polyurethane dispersion (PUD) to form an aqueous emulsion. A suitable substrate is then impregnated with the emulsion, and the coated substrate is dried and cured to produce a synthetic leather article.

In a first method embodiment, the invention provides a method for producing a synthetic leather article comprising the steps of (a) providing a resin or prepolymer, (b) providing an organic colorant complex, (c) mixing the organic colorant complex and the resin or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the fibrous backing substrate to the adhesive layer, and (h) removing the transfer substrate from the assembly produced in (g) to produce a synthetic leather article.

The substrate, resin or prepolymer, and organic colorant complex used in the first method embodiment can be any suitable substrate, resin or prepolymer, and organic colorant complex, including those described above with respect to the synthetic leather articles according to the invention. The transfer substrate used in the first method embodiment can be any substrate that permits the formation of a resin coating thereon, while still enabling that resin coating to be released from the substrate without damaging the coating. Suitable transfer substrates include, but are not limited to, a release paper, such as a silicone-treated, mirror-surface release paper.

In accordance with the first method embodiment, a synthetic leather article can be produced, for example, by thoroughly mixing a polyurethane resin solution in methyl ethyl ketone/dimethylformamide with at least one organic colorant complex and, optionally, with other additives. The mixture is then directly coated onto a release paper. After evaporating the solvent by oven drying or other drying process to produce a resin coating on the release paper, a thin layer of adhesive is applied onto the resin coating. A suitable substrate is then applied to the adhesive layer, and the resulting assembly is heated. The release paper is then peeled off of the assembly to reveal a synthetic leather article. Furthermore, due to the lack of or minimal color migration resulting from the use of the organic colorant complexes, the release paper typically is not discolored by the colorants employed and, therefore, can be reused.

In a second method embodiment, the invention provides a method for producing a synthetic leather article comprising the steps of (a) providing a resin or prepolymer, (b) providing an organic colorant complex, (c) mixing the organic colorant complex and the resin or prepolymer to form a mixture, (d) applying the mixture obtained in step (c) onto a backing substrate, (e) immersing the coated substrate obtained in step (d) in an aqueous solution to cure the resin or prepolymer and form a coating on the surface thereof, (f) removing the substrate from the aqueous solution, and (g) heating the substrate to dry the substrate and produce a synthetic leather article.

The substrate, resin or prepolymer, and organic colorant complex used in the second method embodiment can be any suitable substrate, resin or prepolymer, and organic colorant complex, including those described above with respect to the synthetic leather articles according to the invention.

In accordance with the second method embodiment, a synthetic leather article can be produced, for example, by thoroughly mixing a polyurethane resin or prepolymer solution in dimethylformamide with at least one organic colorant complexes and, optionally, with other additives. The mixture is then coated onto a suitable substrate, and the coated substrate is then immersed in an aqueous medium. While immersed in the aqueous medium, the solvent (e.g., dimethylformamide) is extracted from the mixture, which causes the polymer in the mixture to coagulate and form a film. The resulting substrate is then dried to produce a synthetic leather article.

EXAMPLES

The following examples are given for illustration and should not be considered as limiting the scope of the invention.

Example 1: Synthesis of Colorant Complex Red 1

25.0 gram of Direct Red 23 (30% dye content), 16.5 gram of Ethoquad® C/25 and 25 gram of water were charged into a reactor equipped with agitator, temperature control and condenser. The mixture was heated to 80° C. for 1 hour. The mixture was dissolved in 250 mL of chloroform and washed several times with de-ionized water. After removing chloroform, 10.2 gram of dark red uniform and viscous liquid product with color value of 17 at the maximum absorption at 505 nm was obtained. The sodium level of the colorant complex red 1 is less than 20 ppm as measured by ICP.

Example 2: Synthesis of Colorant Complex Red 2

14.7 gram of Reactive Red 120 (50% dye content), 12.1 gram of Aliquat® 336 and 50 mL of water were heated to 80° C. for 1 hour in a reactor equipped with agitator, temperature control and condenser. Then the reaction mixture was cooled and red solid was precipitate out. The red precipitation was washed with copious amount of water to remove salts and dried in vacuum oven. The product was dark red solid with absorption maximum of 518 nm in methanol.

Example 3: Synthesis of Colorant Complex Red 3

14.7 gram of Reactive Red 120 (50% dye content), 2.81 gram of 3-(2-ethylhexyloxy)-propyl amine, 0.84 gram of sodium bicarbonate and 30 mL of water were charged into a reactor equipped with agitator, temperature control and condenser. The mixture was heated to 80° C. for several hours until the starting material Reactive Red 120 was gone as monitored by TLC. Then 12.1 gram of Aliquat® 336 was added slowly and stirred at 80° C. for one hour. The reaction mixture was cooled to room temperature and dark red solid was precipitated. The solid was filtered and washed with water to remove salts. 24.1 gram of red solid with color value of 12.8 was obtained.

Example 4: Synthesis of Colorant Complex Red 4

15.0 gram of F&DC Red 40 (80% dye content), 43.29 gram of Ethoquad® C/25 and 60 gram of water were charged into a reactor equipped with agitator, temperature control and condenser. The mixture was heated to 85° C. for 1.5 hours. The mixture was dissolved in 250 mL of methylene chloride and washed several times with de-ionized water. After removing methylene chloride, 47.3 gram of dark red uniform and viscous liquid product with color value of 11.2 at the maximum absorption at 501 nm was obtained.

Example 5: Synthesis of Colorant Complex Red 5

15.0 gram of Reactive Red 2 (80% dye content), 43.66 gram of Ethoquad® C/25 and 60 gram of water were charged into a reactor equipped with agitator, temperature control and condenser. The mixture was heated to 85° C. for 1.5 hours. The mixture was dissolved in 250 mL of methylene chloride and washed several times with de-ionized water. After removing methylene chloride, 33.5 gram of dark red uniform and viscous liquid product with color value of 4.72 at the maximum absorptions at 518 nm and 542 nm was obtained.

Example 6: Synthesis of Colorant Complex Red 6

25.0 gram of Direct Red 80 (25% dye content), 20.4 gram of Ethoquad® C/25 and 25 gram of water were charged into a reactor equipped with agitator, temperature control and condenser. The mixture was heated to 80° C. for 1 hour. The mixture was dissolved in 250 mL of chloroform and washed several times with de-ionized water. After removing chloroform, 9.8 gram of dark red uniform and viscous liquid product with color value of 11.5 at the maximum absorption at 532 nm was obtained. The sodium level of the colorant complex red 6 is less than 30 ppm as measured by ICP.

Example 7: Synthesis of Colorant Complex Red 7

5.5 gram of Direct Red 80 (25% dye content), 3.0 gram of Arquad® 2HT-75 and 25 gram of water were charged into a reactor equipped with agitator, temperature control and condenser. The mixture was heated to 80° C. for 1 hour. The mixture was cooled to room temperature and dark red material was precipitated out. After washing several times with de-ionized water and drying, 4.2 gram of dark red powder with color value of 30.7 at the maximum absorption at 540 nm in DMF was obtained.

Example 8: Synthesis of Colorant Complex Red 8

5.5 gram of Direct Red 80 (25% dye content), 25 gram of water and 2.3 gram of benzyltriphenylphosphonium chloride were charged into a reactor equipped with agitator, temperature control and condenser. The mixture was heated to 80° C. for 1 hour. The mixture was cooled to room temperature and dark red material was precipitated out. After washing several times with de-ionized water and drying, 3.4 gram of dark red powder with color value of 33.3 at the maximum absorption at 527 nm in methanol was obtained.

Example 9: Synthesis of Colorant Complex Blue 1

20.0 gram of Acid Blue 317 (Isolan Blue NHF-S), 45.28 gram of Ethoquad® C/25 and 60 gram of water were charged into a reactor equipped with agitator, temperature control and condenser. The mixture was heated to 85° C. for 1.5 hours. The mixture was dissolved in 250 mL of methylene chloride and washed several times with de-ionized water. After removing methylene chloride, dark red uniform and viscous liquid product with color value of 8.16 at the maximum absorption at 598 nm was obtained.

Example 10: Synthesis of Colorant Complex Blue 2

4.96 gram of Direct Blue 15, 7.78 gram of benzyltriphenylphosphonium chloride and 30 gram of water were charged into a reactor equipped with agitator, temperature control and condenser. The mixture was heated to 50° C. for one hour. The dark blue precipitate was washed several times with de-ionized water. After drying, 7.23 gram of dark blue powder color value of 21.6 at the maximum absorption at 607 nm was obtained.

Example 11: Synthesis of Colorant Complex Blue 3

11.6 gram of Direct Blue 71, 9.33 gram of benzyltriphenylphosphonium chloride and 30 gram of water were charged into a reactor equipped with agitator, temperature control and condenser. The mixture was heated to 50° C. for one hour. The dark blue precipitate was washed several times with de-ionized water. After drying, 13.8 gram of dark blue powder color value of 22.6 at the maximum absorption at 584 nm was obtained.

Example 12: Synthesis of Colorant Complex Blue 4

5.79 gram of Copper phthalocyanine tetrasulfonic acid tetrasodium salt, 7.78 gram of benzyltriphenylphosphonium chloride and 50 gram of water were charged into a reactor equipped with agitator, temperature control and condenser. The mixture was heated to 70° C. for one hour. The dark blue precipitate was washed several times with de-ionized water. After drying, 11.9 gram of dark blue solid color value of 89.0 at the maximum absorption at 669 nm in methanol was obtained.

Example 13: Synthesis of Colorant Complex Blue 5

5.79 gram of Acid Blue 9, 7.78 gram of benzyltriphenylphosphonium chloride and 50 gram of water were charged into a reactor equipped with agitator, temperature control and condenser. The mixture was heated to 60° C. for one hour. The dark blue precipitate was washed several times with de-ionized water. After drying, 7.7 gram of dark blue solid color value of 72.7 at the maximum absorption at 627 nm in methanol was obtained.

Example 14: Synthesis of Colorant Complex Yellow 1

7.18 gram of Direct Yellow 50, 4.67 gram of benzyltriphenylphosphonium chloride and 30 gram of water were charged into a reactor equipped with agitator, temperature control and condenser. The mixture was heated to 50° C. for one hour. The dark yellow precipitate was washed several times with de-ionized water. After drying, 7.38 gram of dark brown powder color value of 25.9 at the maximum absorption at 400 nm was obtained.

Example 15: Synthesis of Colorant Complex Yellow 2

6.62 gram of Direct Yellow 27, 7.78 gram of benzyltriphenylphosphonium chloride and 30 gram of water were charged into a reactor equipped with agitator, temperature control and condenser. The mixture was heated to 50° C. for one hour. The dark yellow precipitate was washed several times with de-ionized water. After drying, 9.65 gram of dark yellow powder color value of 13.0 at the maximum absorption at 402 nm was obtained.

Example 16: Synthesis of Colorant Complex Black 1

7.23 gram of Brilliant Black BN (Food Black 1), 7.78 gram of benzyltriphenylphosphonium chloride and 30 gram of water were charged into a reactor equipped with agitator, temperature control and condenser. The mixture was heated to 60° C. for one hour. The dark black precipitate was washed several times with de-ionized water. After drying, 12.8 gram of dark black solid color value of 17.5 at the maximum absorption at 577 nm was obtained.

Example 17: Synthesis of Colorant Complex Black 2

9.02 gram of Reactive Black 5 (55% dye content), 3.15 gram of diglycol amine, 0.84 gram of sodium bicarbonate and 30 mL of water were charged into a reactor equipped with agitator, temperature control and condenser. The mixture was heated to 80° C. for several hours until the starting material Reactive Black 5 was gone as monitored by TLC. Then 3.9 gram of benzyltriphenylphosphonium chloride was added slowly and stirred at 80° C. for one hour. The reaction mixture was cooled to room temperature and dark black solid was precipitated. The solid was filtered and washed with water to remove salts. 8.9 gram of black solid with color value of 21.9 at maximum absorption of 587 nm was obtained.

Example 18: Synthesis of Colorant Complex Black 3

36.08 gram of Reactive Black 5 (55% dye content), 6.3 gram of diglycol amine, 3.28 gram of sodium bicarbonate and 80 mL of water were charged into a reactor equipped with agitator, temperature control and condenser. The mixture was heated to 60° C. for several hours until the starting material Reactive Black 5 was gone as monitored by TLC. Then 16.2 gram of Aliquat® 336 was added slowly and stirred at 60° C. for one hour. The reaction mixture was cooled to room temperature and dark black solid was precipitated. The solid was filtered and washed with water to remove salts. 27.8 gram of black solid with color value of 20.9 at maximum absorption of 577 nm was obtained.

Example 19: Synthesis of Colorant Complex Black 4

7.82 gram of Chlorazol Black (Direct Black 38), 7.78 gram of benzyltriphenylphosphonium chloride and 30 gram of water were charged into a reactor equipped with agitator, temperature control and condenser. The mixture was heated to 60° C. for one hour. The dark black precipitate was washed several times with de-ionized water. After drying, 8.18 gram of dark black solid color value of 29.6 at the maximum absorption at 598 nm was obtained.

Example 20: Production of Red Synthetic Leather

This example demonstrates the production of synthetic leather articles in accordance with the invention. 5 parts colorant complex red 1 from Example 1 was mixed well with 100 part of polyurethane resin SU-9704 from Stahl. This red polyurethane resin solution was directly applied onto a commercially available silicone-treated, mirror-surface release paper to form a film coating having a thickness of approximately 15 microns. A commercially available base substrate having a thickness of 1 mm (a non-woven fibrous sheet having a thickness of 80 microns and a polyurethane elastomer impregnated/coated and solidified on one side) was then pressed/bonded onto this film coating. Then, the assembly was heated to a temperature of approximately 120° C. in an oven and kept at that temperature for 3 minutes. The assembly was then removed from the oven and cooled down to room temperature, and the release paper was then peeled off of the assembly. A synthetic leather article having a red skin layer was thus obtained. Furthermore, no visible red color was detected on the release paper, which suggests that none of the red colorant had migrated onto the release paper. The synthetic leather article was tested for leather to leather migration. The synthetic leather article was pressed with clean white PVC or PU synthetic leather in 70° C. oven for 24 hours. Then the white PVC or PVC synthetic leather samples were measured for colors transferred from the inventive synthetic leather. No visible red color was detected on the PVC or PU synthetic test leather surface, and the grey scale rating of the PVC or PU synthetic test leather surface was higher than 4.5.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A coating comprising at least one anionic dye, at least one quaternary cationic compound, and at least one resin, wherein the at least one anionic dye and quaternary cationic compound form a colored complex represented by $$AB_nQ_m$$

wherein A is organic chromophore with or without organic substitution; B is an anionic group; Q is an organic cationic counterion; n and m are integers from 1 to 20; and wherein the coating is substantially salt-free.

2. The coating of claim 1, wherein m is less than or equal to n.

3. The coating of claim 1, wherein the at least one resin is selected from the group consisting of polyurethane resin, polyurea resin, and combinations thereof.

4. The coating of claim 3, wherein the at least one resin is a polyurethane resin.

5. The coating of claim 1, wherein the at least one anionic dye is selected from the group consisting of a reactive dye, a direct dye, a metal complex dye, a food dye, an acid mordant dye, and an acid dye.

6. The coating of claim 1, wherein the at least one anionic dye contains one or more sulfonate groups, carboxyl groups, hydroxyl salt groups, or mixtures thereof.

7. The coating of claim 1, wherein the organic cationic compound is selected from the group consisting of quaternary ammonium salts and any nitrogen-based cationic compound, sulfonium salts, phosphonium salts, oxonium salts, and any combination thereof of alkyl, aryl and alkyl/aryl compounds.

8. The coating of claim 1, wherein the organic cationic compound is selected from the group consisting of quaternary ammonium and phosphonium groups.

9. The coating of claim 1, wherein the at least one quaternary cationic compound is selected from the group consisting of trialkyl, dialkyl, dialkoxy alkyl, monoalkoxy, benzyl, imidazolinidium quaternary ammonium and organic phosphonium compounds.

10. The coating of claim 1, wherein the coating is transparent.

11. A synthetic leather article comprising a substrate and at least one layer of the coating of claim 1.

12. The synthetic leather article of claim 11, wherein the substrate is a textile material.

* * * * *